(12) United States Patent
Tanzawa (10) Patent No.: US 9,778,846 B2
(45) Date of Patent: *Oct. 3, 2017

(54) SEQUENTIAL MEMORY ACCESS OPERATIONS

(71) Applicant: MICRON TECHNOLOGY, INC., Boise, ID (US)

(72) Inventor: Toru Tanzawa, Tokyo (JP)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/244,163

(22) Filed: Aug. 23, 2016

(65) Prior Publication Data

US 2016/0357441 A1    Dec. 8, 2016

Related U.S. Application Data

(63) Continuation of application No. 14/479,703, filed on Sep. 8, 2014, now Pat. No. 9,430,417.

(51) Int. Cl.
*G06F 3/06* (2006.01)
*G06F 12/14* (2006.01)
*G06F 12/06* (2006.01)
*G06F 13/16* (2006.01)

(52) U.S. Cl.
CPC .......... *G06F 3/0604* (2013.01); *G06F 3/0611* (2013.01); *G06F 3/0625* (2013.01); *G06F 3/0659* (2013.01); *G06F 3/0679* (2013.01); *G06F 12/06* (2013.01); *G06F 12/0623* (2013.01); *G06F 12/14* (2013.01); *G06F 13/1657* (2013.01); *G06F 13/1694* (2013.01); *G06F 2212/1024* (2013.01); *G06F 2212/1028* (2013.01); *G06F 2212/1052* (2013.01); *G06F 2212/214* (2013.01); *G06F 2212/2532* (2013.01); *Y02B 60/1228* (2013.01)

(58) Field of Classification Search
CPC .... G06F 3/0679; G06F 3/0659; G06F 3/0604; G06F 12/14; G06F 3/0611; G06F 12/06; G06F 2212/1028; G06F 2212/1024; G06F 2212/152; G06F 3/0625; G06F 2212/214
USPC ......................................... 711/103, 156, 167
See application file for complete search history.

(56) References Cited

U.S. PATENT DOCUMENTS

| | | |
|---|---|---|
| 7,058,752 B2 | 6/2006 | Kareenahalli et al. |
| 8,320,196 B2 | 11/2012 | Yan et al. |
| 2004/0034748 A1 | 2/2004 | Tomishima et al. |
| 2014/0160107 A1 | 6/2014 | Lo et al. |

*Primary Examiner* — Jasmine Song
(74) *Attorney, Agent, or Firm* — Dicke, Billig & Czaja, PLLC (57) ABSTRACT

Methods of operating a memory include performing a memory access operation, obtaining an address corresponding to a subsequent memory access operation prior to stopping the memory access operation, stopping the memory access operation, sharing charge between access lines used for the memory access operation and access lines to be used for the subsequent memory access operation, and performing the subsequent memory access operation.

20 Claims, 10 Drawing Sheets

SEQUENTIAL MEMORY ACCESS OPERATIONS

RELATED APPLICATION

This Application is a continuation of U.S. application Ser. No. 14/479,703, titled "SEQUENTIAL MEMORY ACCESS OPERATIONS," filed Sep. 8, 2014, now U.S. Pat. No. 9,430,417, issued on Aug. 30, 2016 which is commonly assigned and incorporated herein by reference.

TECHNICAL FIELD

The present disclosure relates generally to memory and, in particular, in one or more embodiments, the present disclosure relates to sequential memory access operations sharing charges between access lines.

BACKGROUND

Memory devices are typically provided as internal, semiconductor, integrated circuit devices in computers or other electronic devices. There are many different types of memory including random-access memory (RAM), read only memory (ROM), dynamic random access memory (DRAM), synchronous dynamic random access memory (SDRAM), and flash memory.

Flash memory devices have developed into a popular source of non-volatile memory for a wide range of electronic applications. Flash memory devices typically use a one-transistor memory cell that allows for high memory densities, high reliability, and low power consumption. Changes in threshold voltage of the memory cells, through programming (which is often referred to as writing) of charge storage structures (e.g., floating gates or charge traps) or other physical phenomena (e.g., phase change or polarization), determine the data value of each cell. Common uses for flash memory include personal computers, personal digital assistants (PDAs), digital cameras, digital media players, cellular telephones, solid state drives and removable memory modules, and the uses are growing.

Power consumption is often an important consideration in the design and usage of memory devices. Speed of memory access can be another important consideration in the design and usage of memory devices.

For the reasons stated above, and for other reasons stated below which will become apparent to those skilled in the art upon reading and understanding the present specification, there is a need in the art for alternative methods of operating memory, and apparatus to perform such methods.

DETAILED DESCRIPTION

In the following detailed description, reference is made to the accompanying drawings that form a part hereof, and in which is shown, by way of illustration, specific embodiments. In the drawings, like reference numerals describe substantially similar components throughout the several views. Other embodiments may be utilized and structural, logical and electrical changes may be made without departing from the scope of the present disclosure. The following detailed description is, therefore, not to be taken in a limiting sense.

Memory access operations, e.g., program operations (sometimes referred to as write operations), read operations and erase operations generally involve the application of various voltages to the control gate, source, drain and/or channel of memory cells of an array of memory cells (e.g., memory array). Between access operations, these voltages are generally discharged.

Access lines to memory cells often present relatively large capacitances due to extended conductor runs, such that a significant amount of power and time can be expended in bringing these access lines to their desired voltage levels. Various embodiments described herein seek to reduce the power and time requirements necessary to bring access lines to their desired voltage levels by incorporating sharing of charge between access lines used during one memory access operation (e.g., a prior access operation) and access lines used during a subsequent access operation. By sharing charge between access operations, the power and time to bring an access line to its desired voltage level for a particular access operation may be reduced.

Figure 1A:
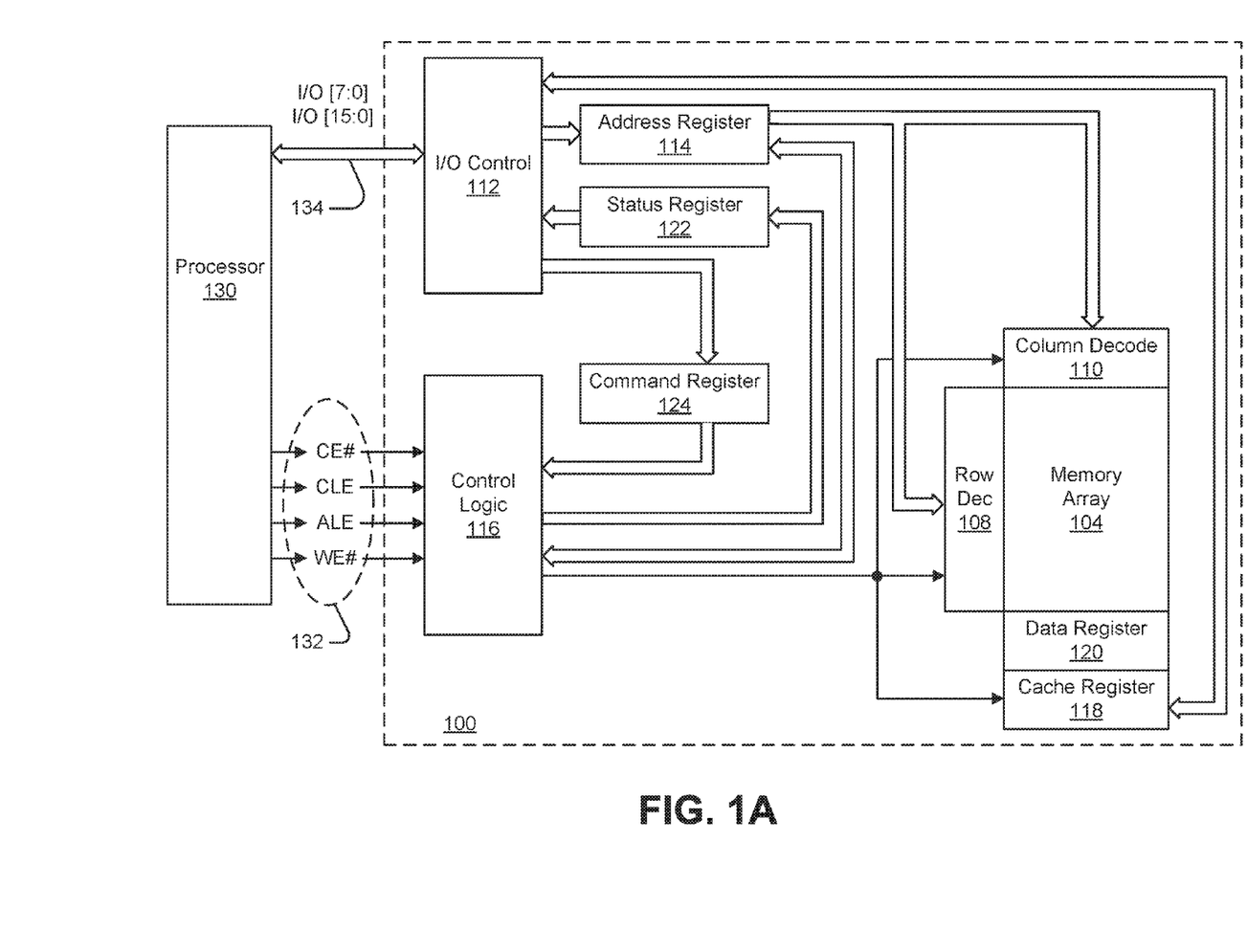
FIG. 1A is a simplified block diagram of a memory device in communication with a processor as part of an electronic system, according to an embodiment.

FIG. 1A is a simplified block diagram of a first apparatus, in the form of a memory device 100, in communication with a second apparatus, in the form of a processor 130, as part of a third apparatus, in the form of an electronic system, according to an embodiment. Some examples of electronic systems include personal computers, personal digital assistants (PDAs), digital cameras, digital media players, digital recorders, games, appliances, vehicles, wireless devices, cellular telephones and the like. The processor 130, e.g., a controller external to the memory device 100, may be a memory controller or other external host device.

Memory device 100 includes an array of memory cells 104 logically arranged in rows and columns. Memory cells of a logical row are typically coupled to the same access line (commonly referred to as a word line) while memory cells of a logical column are typically selectively coupled to the same data line (commonly referred to as a bit line). A single access line may be associated with more than one logical row of memory cells and a single data line may be associated with more than one logical column. Memory cells (not shown in FIG. 1A) of at least a portion of array of memory cells 104 are capable of being programmed to one of at least two data states.

A row decode circuitry 108 and a column decode circuitry 110 are provided to decode address signals. Address signals are received and decoded to access the array of memory cells 104. Memory device 100 also includes input/output (I/O) control circuitry 112 to manage input of commands, addresses and data to the memory device 100 as well as output of data and status information from the memory device 100. An address register 114 is in communication with I/O control circuitry 112 and row decode circuitry 108 and column decode circuitry 110 to latch the address signals prior to decoding. A command register 124 is in communication with I/O control circuitry 112 and control logic 116 to latch incoming commands.

An internal controller (e.g., control logic 116) controls access to the array of memory cells 104 in response to the commands and generates status information for the external processor 130, i.e., control logic 116 is configured to perform access operations in accordance with embodiments described herein. The control logic 116 is in communication with row decode circuitry 108 and column decode circuitry 110 to control the row decode circuitry 108 and column decode circuitry 110 in response to the addresses.

Control logic 116 is also in communication with a cache register 118. Cache register 118 latches data, either incoming or outgoing, as directed by control logic 116 to temporarily store data while the array of memory cells 104 is busy writing or reading, respectively, other data. During a program operation (e.g., write operation), data is passed from the cache register 118 to data register 120 for transfer to the array of memory cells 104; then new data is latched in the cache register 118 from the I/O control circuitry 112. During a read operation, data is passed from the cache register 118 to the I/O control circuitry 112 for output to the external processor 130; then new data is passed from the data register 120 to the cache register 118. A status register 122 is in communication with I/O control circuitry 112 and control logic 116 to latch the status information for output to the processor 130.

Memory device 100 receives control signals at control logic 116 from processor 130 over a control link 132. The control signals may include at least a chip enable CE#, a command latch enable CLE, an address latch enable ALE, and a write enable WE#. Additional control signals (not shown) may be further received over control link 132 depending upon the nature of the memory device 100. Memory device 100 receives command signals (which represent commands), address signals (which represent addresses), and data signals (which represent data) from processor 130 over a multiplexed input/output (I/O) bus 134 and outputs data to processor 130 over I/O bus 134.

For example, the commands are received over input/output (I/O) pins [7:0] of I/O bus 134 at I/O control circuitry 112 and are written into command register 124. The addresses are received over input/output (I/O) pins [7:0] of bus 134 at I/O control circuitry 112 and are written into address register 114. The data are received over input/output (I/O) pins [7:0] for an 8-bit device or input/output (I/O) pins [15:0] for a 16-bit device at I/O control circuitry 112 and are written into cache register 118. The data are subsequently written into data register 120 for programming the array of memory cells 104. For another embodiment, cache register 118 may be omitted, and the data are written directly into data register 120. Data are also output over input/output (I/O) pins [7:0] for an 8-bit device or input/output (I/O) pins [15:0] for a 16-bit device.

It will be appreciated by those skilled in the art that additional circuitry and signals can be provided, and that the memory device of FIG. 1A has been simplified. It should be recognized that the functionality of the various block components described with reference to FIG. 1A may not necessarily be segregated to distinct components or component portions of an integrated circuit device. For example, a single component or component portion of an integrated circuit device could be adapted to perform the functionality of more than one block component of FIG. 1A. Alternatively, one or more components or component portions of an integrated circuit device could be combined to perform the functionality of a single block component of FIG. 1A.

Additionally, while specific I/O pins are described in accordance with popular conventions for receipt and output of the various signals, it is noted that other combinations or numbers of I/O pins may be used in the various embodiments.

Figure 1B:
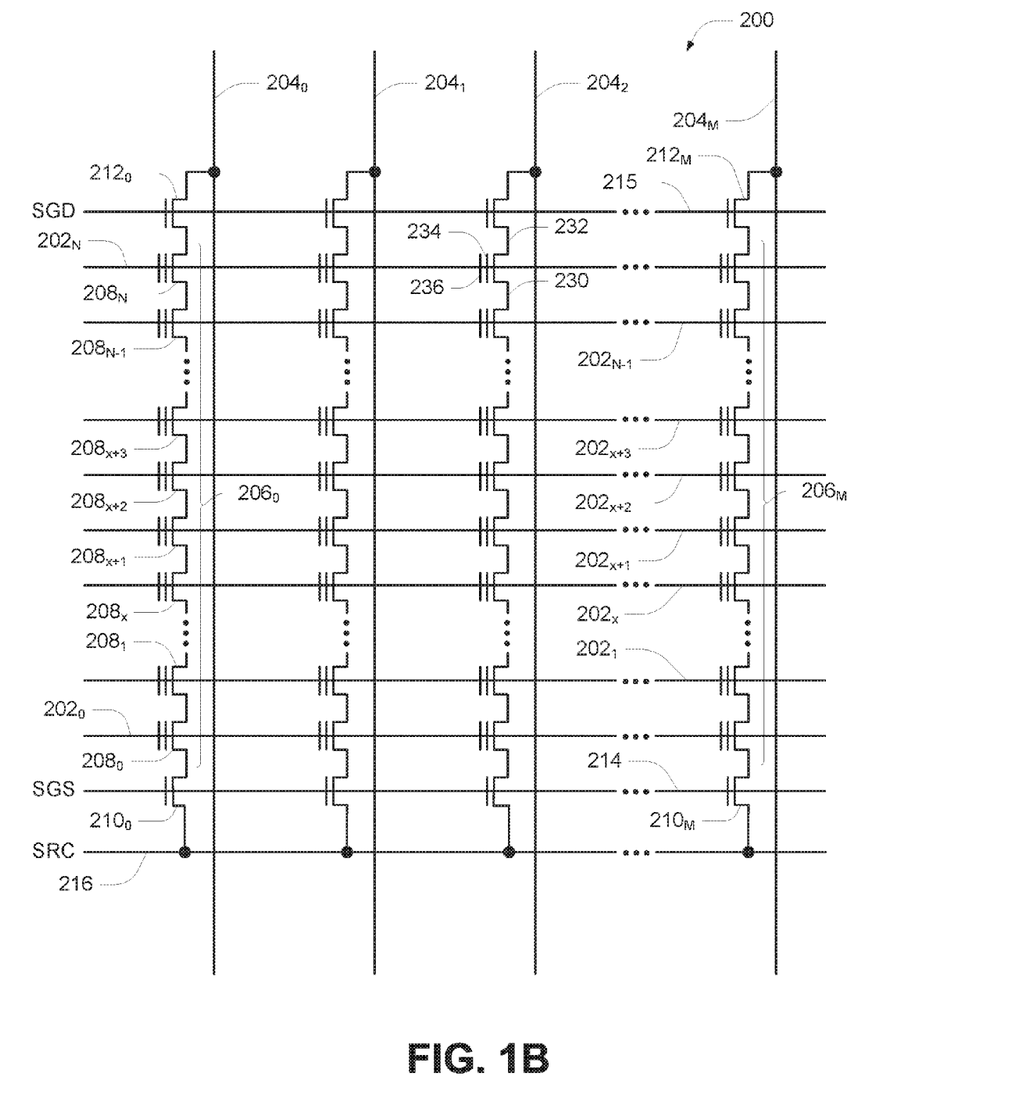
FIG. 1B is a schematic of a portion of an array of memory cells as could be used in a memory device of the type described with reference to FIG. 1A.

FIG. 1B is a schematic of a NAND memory array 200, e.g., as a portion of array of memory cells 104. Memory array 200 includes access lines, such as word lines $202_0$ to $202_N$, and data lines, such as bit lines $204_0$ to $204_M$. The word lines 202 may be coupled to global access lines (e.g., global word lines), not shown in FIG. 1B, in a many-to-one relationship. For some embodiments, memory array 200 may be formed over a semiconductor that, for example, may be conductively doped to have a conductivity type, such as a p-type conductivity, e.g., to form a p-well, or an n-type conductivity, e.g., to form an n-well.

Memory array 200 might be arranged in rows (each corresponding to a word line 202) and columns (each corresponding to a bit line 204). Each column may include a string of series-coupled memory cells, such as one of NAND strings $206_0$ to $206_M$. Each NAND string 206 might be coupled to a common source 216 and might include memory cells $208_0$ to $208_N$. The memory cells 208 represent non-volatile memory cells for storage of data. The memory cells 208 of each NAND string 206 might be connected in series between a select transistor 210 (e.g., a field-effect transistor), such as one of the select transistors $210_0$ to $210_M$ (e.g., that may be source select transistors, commonly referred to as select gate source), and a select transistor 212 (e.g., a field-effect transistor), such as one of the select transistors $212_0$ to $212_M$ (e.g., that may be drain select transistors, commonly referred to as select gate drain). Select transistors $210_0$ to $210_M$ might be commonly coupled to a select line 214, such as a source select line, and select transistors $212_0$ to $212_M$ might be commonly coupled to a select line 215, such as a drain select line.

A source of each select transistor 210 might be connected to common source 216. The drain of each select transistor 210 might be connected to a memory cell $208_0$ of the corresponding NAND string 206. For example, the drain of select transistor $210_0$ might be connected to memory cell $208_0$ of the corresponding NAND string $206_0$. Therefore, each select transistor 210 might be configured to selectively couple a corresponding NAND string 206 to common source 216. A control gate of each select transistor 210 might be connected to select line 214.

The drain of each select transistor 212 might be connected to the bit line 204 for the corresponding NAND string 206. For example, the drain of select transistor $212_0$ might be connected to the bit line $204_0$ for the corresponding NAND string $206_0$. The source of each select transistor 212 might be connected to a memory cell $208_N$ of the corresponding NAND string 206. For example, the source of select transistor $212_0$ might be connected to memory cell $208_N$ of the corresponding NAND string $206_0$. Therefore, each select transistor 212 might be configured to selectively couple a corresponding NAND string 206 to a corresponding bit line 204. A control gate of each select transistor 212 might be connected to select line 215.

The memory array in FIG. 1B might be a quasi-two-dimensional memory array and might have a generally planar structure, e.g., where the common source 216, strings 206 and bit lines 204 extend in substantially parallel planes. Alternatively, the memory array in FIG. 1B might be a three-dimensional memory array, e.g., where strings 206 may extend substantially perpendicular to a plane containing the common source 216 and to a plane containing the bit lines 204 that may be substantially parallel to the plane containing the common source 216.

Typical construction of memory cells 208 includes a data-storage structure 234 (e.g., a floating gate, charge trap, etc.) that can determine a data value of the cell (e.g., through changes in threshold voltage), and a control gate 236, as shown in FIG. 1B. In some cases, memory cells 208 may further have a defined source 230 and a defined drain 232. Memory cells 208 have their control gates 236 coupled to (and in some cases form) a word line 202.

A column of the memory cells 208 is a NAND string 206 or a plurality of NAND strings 206 coupled to a given bit line 204. A row of the memory cells 208 are memory cells 208 commonly coupled to a given word line 202. A row of memory cells 208 can, but need not include all memory cells 208 commonly coupled to a given word line 202. Rows of memory cells 208 may often be divided into one or more groups of physical pages of memory cells 208, and physical pages of memory cells 208 often include every other memory cell 208 commonly coupled to a given word line 202. For example, memory cells 208 commonly coupled to word line $202_N$ and selectively coupled to even bit lines 204 (e.g., bit lines $204_0$, $204_2$, $204_4$, etc.) may be one physical page of memory cells 208 (e.g., even memory cells) while memory cells 208 commonly coupled to word line $202_N$ and selectively coupled to odd bit lines 204 (e.g., bit lines $204_1$, $204_3$, $204_5$, etc.) may be another physical page of memory cells 208 (e.g., odd memory cells). Although bit lines $204_3$-$204_5$ are not expressly depicted in FIG. 1B, it is apparent from the figure that the bit lines 204 of the array of memory cells 200 may be numbered consecutively from bit line $204_0$ to bit line $204_M$. Other groupings of memory cells 208 commonly coupled to a given word line 202 may also define a physical page of memory cells 208. For certain memory devices, all memory cells commonly coupled to a given word line might be deemed a physical page. The portion of a physical page (which, in some embodiments, could still be the entire row) that is read during a single read operation or programmed during a program operation (e.g., an upper or lower page memory cells) might be deemed a logical page.

Although the example of FIG. 1B is discussed in conjunction with NAND flash, the embodiments described herein are not limited to a particular array architecture or structure, and can include other structures (e.g., cross-point memory, DRAM, etc.) and other architectures (e.g., AND arrays, NOR arrays, etc.).

Figure 2:
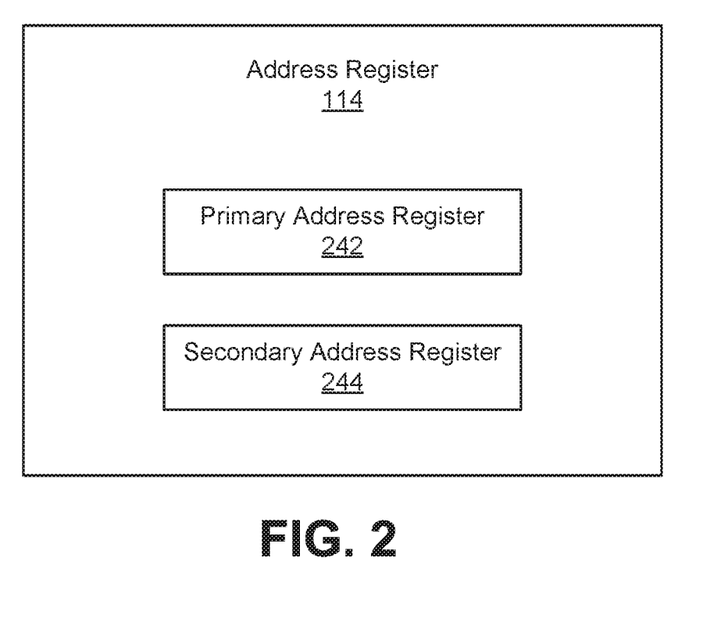
FIG. 2 is a simplified block diagram of an address register according to an embodiment as could be used in a memory device of the type described with reference to FIG. 1A.

FIG. 2 is a simplified block diagram of an address register 114 according to an embodiment as could be used in a memory device of the type described with reference to FIG. 1A. In order to share charge between access lines of sequential memory access operations, the memory may need to have access to addresses corresponding to memory access operations. For example, memory access operations are associated with addresses defining where in a memory array, or group of memory arrays, the access operation is to be performed. For example, a program operation may have an associated address identifying one or more memory cells selected for programming. In response to this address, the controller (e.g., control logic 116) can determine what voltages are applied to various access lines to effect that programming. In a NAND architecture memory device containing strings of memory cells, this may involve applying a program voltage to an access line coupled to a selected memory cell of a particular string of memory cells, and applying varying voltages to access lines coupled to other (e.g., unselected) memory cells of the particular string of memory cells. It is recognized that an access line coupled to a selected memory cell for a particular access operation is typically coupled to a large number of other memory cells that may or may not be selected for that particular access operation.

By having access to addresses corresponding to sequential memory access operations, the controller can determine which access lines to select for charge sharing. The address register 114 of FIG. 2 may thus include storage for an address corresponding to a particular memory access operation (e.g., a current or prior memory access operation), such as primary address register 242, and storage for an address corresponding to a subsequent memory access operation (e.g., an immediately subsequent memory access operation), such as secondary address register 244. Addresses may be received in conjunction with each of the sequential memory access operations. Alternatively, subsequent addresses may be generated by the controller, such as where a command defines a series of sequential memory access operations beginning at some starting address, and the controller determines a subsequent address in response to the starting address. Address register 114 may have additional registers (not shown) similar to the primary address register 242 and secondary address register 244.

In the configuration of the address register 114, the controller (e.g., control logic 116) may control a current memory access operation in response to the address information (e.g., address) stored in the primary address register 242, and may control charge sharing operations occurring between the current memory access operation and the subsequent memory access operation in response to the address information stored in the primary address register 242 and the secondary address register 244. Subsequent to any charge sharing operations, the address information from the secondary address register 244 may be transferred to the primary address register 242, providing the controller with the appropriate address for controlling the subsequent memory access operation. The secondary address register 244 is then available to receive address information for a next subsequent memory access operation.

Figure 3A:
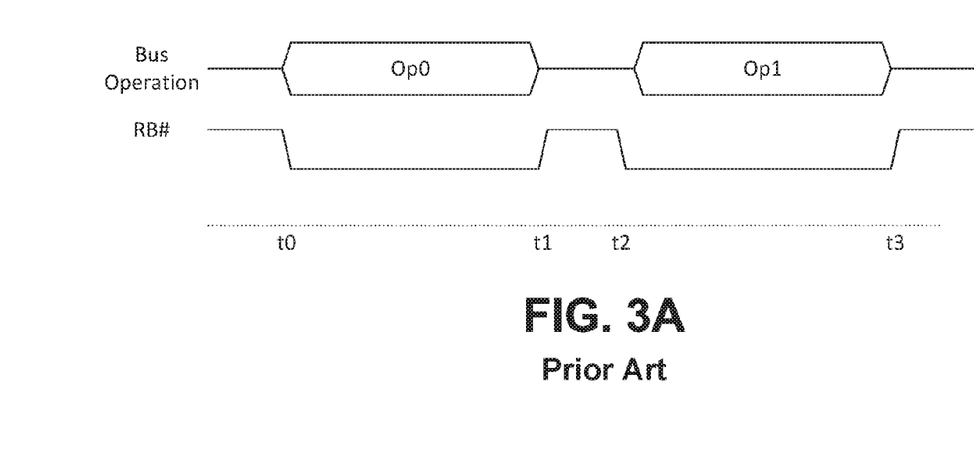
FIG. 3A shows a timing diagram of a conventional sequential memory access.

FIG. 3A shows a timing diagram of a conventional sequential memory access. FIG. 3A conceptually depicts that a memory in a conventional memory access may indicate that it is busy, e.g., unavailable to perform other operations, during a memory access operation, e.g., memory access operation Op0 or Op1. In a typical process, at time t0, when the first memory access operation Op0 begins, the memory would indicate that it is busy by transitioning the ready-busy signal RB# to a logic low level. At time t1, when the first memory access operation Op0 is complete, the ready-busy signal RB# is transitioned to a logic high level indicating that it is available for subsequent access. A controller (e.g., external processor 130) might then request data for a subsequent memory access operation Op1. The memory might then indicate that it is busy at time t2 at the start of the memory access operation Op1, and release this indication at the completion of the memory access operation Op1 at time t3.

Figure 3B:
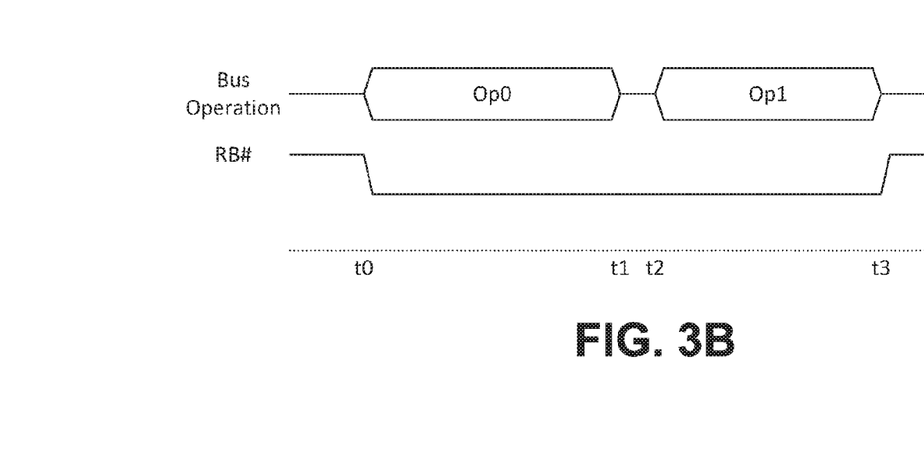
FIG. 3B shows a timing diagram of a sequential memory access according to an embodiment.

FIG. 3B shows a timing diagram of a sequential memory access according to an embodiment. FIG. 3B conceptually depicts that a memory in a memory access of various embodiments may continue to indicate that it is busy between sequential memory access operations Op0 and Op1, such as when charge sharing is occurring as described subsequently in more detail. During memory access operation Op0, the address information for the subsequent memory access operation Op1 is obtained, e.g., either received from an external controller (e.g., external processor 130) or generated by an internal controller (e.g., control logic 116), prior to the completion of the memory access operation Op0 at time t1. Because of the charge sharing occurring between times t1 and t2 of FIG. 3B, the subsequent memory access operation Op1 may need less time to precharge its access lines, such that the length of memory access operation Op1, e.g., the length of time between time t2 and time t3, may be reduced in comparison to the convention process of FIG. 3A.

Figure 4A:
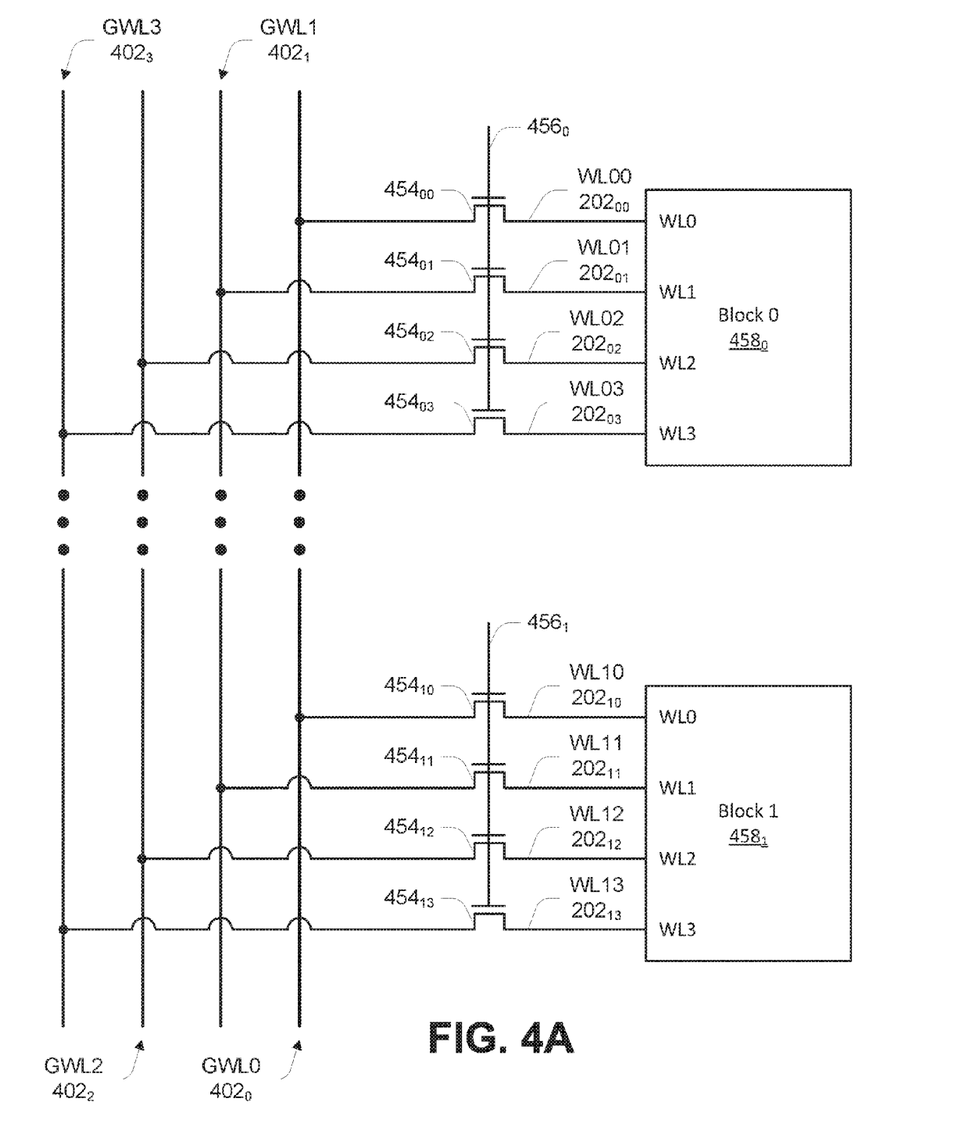
FIG. 4A is a schematic of a portion of an array of memory cells as could be used in a memory device of the type described with reference to FIG. 1A.

Various embodiments facilitate charge sharing between local access lines (e.g., those coupled directly to strings 206) through a common connectivity to a global access line. FIG. 4A is a schematic of a portion of an array of memory cells as could be used in a memory device of the type described with reference to FIG. 1A and depicting this many-to-one relationship between local access lines (e.g., word lines 202) and global access lines (e.g., global word lines 402).

As depicted in FIG. 4A, a plurality of memory blocks 458 may have their local access lines (e.g., word lines 202) commonly selectively connected to a plurality of global access lines (e.g., global word lines 402). A memory block 458 may include a plurality of memory strings 206 commonly coupled to a particular set of word lines 202. For example, the memory strings $206_0$-$206_M$ of FIG. 1B, or some portion thereof, may represent a memory block 458. Although FIG. 4A depicts only memory blocks $458_0$ and $458_1$ (Block 0 and Block 1), additional memory blocks 458 may have their word lines 202 commonly connected to global word lines 402 in a like manner. Similarly, although FIG. 4A depicts only four word lines 202, memory blocks 458 may include fewer or more word lines 202.

To facilitate memory access operations to specific memory blocks 458 commonly coupled to a given set of global word lines 402, each memory block 458 may have a corresponding set of block select transistors 454 in a one-to-one relationship with their word lines 202. Control gates of the set of block select transistors 454 for a given memory block 458 may have their control gates commonly coupled to a corresponding block select line 456. For example, for memory block $458_0$, word line $202_{00}$ may be selectively connected to global word line $402_0$ through block select transistor $454_{00}$, word line $202_{01}$ may be selectively connected to global word line $402_1$ through block select transistor $454_{01}$, word line $202_{02}$ may be selectively connected to global word line $402_2$ through block select transistor $454_{02}$, and word line $202_{03}$ may be selectively connected to global word line $402_3$ through block select transistor $454_{03}$, while block select transistors $454_{00}$-$454_{03}$ are responsive to a control signal received on block select line $456_0$. For such a configuration, each word line 202 of memory block $458_0$ (e.g., word line $202_{00}$) can be commonly connected to its corresponding word line 202 of memory block $458_1$ (e.g., word line $202_{10}$) through concurrent activation of their respective block select transistors 454 (e.g., block select transistors $454_{00}$ and $454_{10}$), such as concurrently applying a logic high signal to their respective block select lines (e.g., block select lines $456_0$ and $456_1$), thereby commonly connecting them to their respective global word line (e.g., global word line $402_0$). As used herein, a first act and a second act occur concurrently when the first act occurs simultaneously with the second act for at least a portion of a duration of the second act, e.g., block select line $456_0$ and block select line $456_1$ are simultaneously at a logic high level for at least a portion of a duration of applying the logic high signal to block select line $456_1$.

Figure 4B:
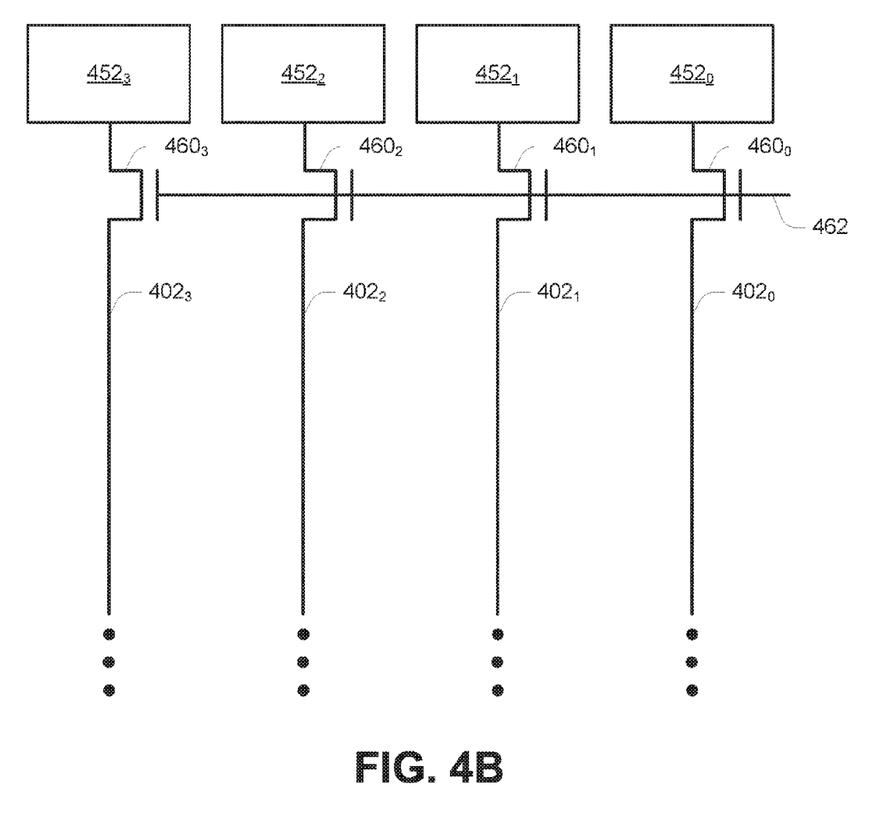
FIG. 4B is a schematic of a driver configuration for global access lines as could be used with the portion of the array of memory cells of FIG. 4A.

Global access lines are typically coupled to driver circuitry to apply the various voltage levels to the global access lines for the various access operations. To share charge between local access lines, it may be desirable to isolate the global access lines from their respective driver circuitry or otherwise electrically float them. FIG. 4B is a schematic of a driver configuration for global access lines as could be used with the portion of the array of memory cells of FIG. 4A. FIG. 4B shows that global access lines (e.g., global word lines $402_0$-$402_3$) may be selectively coupled to global access line drivers (e.g., global word line drivers $452_0$-$452_3$) through driver select transistors $460_0$-$460_3$, respectively. Although driver select transistors $460_0$-$460_3$ are shown to be commonly coupled to a single driver select line 462, such that all global word lines $402_0$-$402_3$ are either commonly connected to, or commonly isolated from, their respective global word line driver $452_0$-$452_3$, each driver select transistor 460 could receive its own control signal to allow individual connection or isolation.

Figure 5:
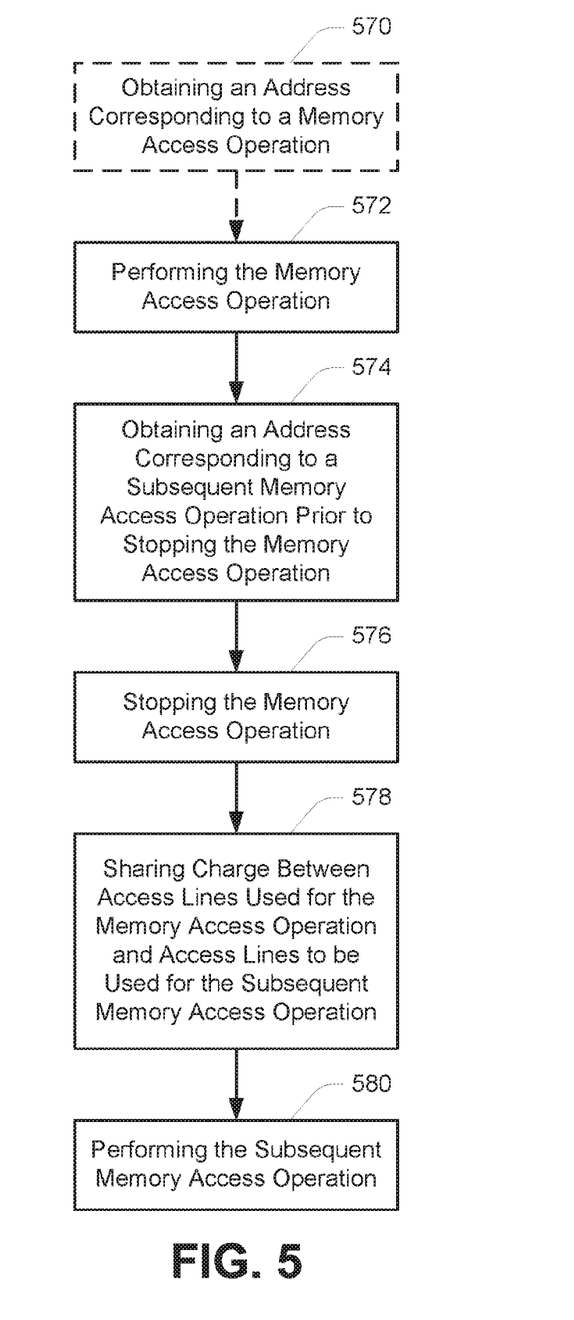
FIG. 5 is a flowchart of a method of operating a memory according to an embodiment.

FIG. 5 is a flowchart of a method of operating a memory according to an embodiment. At 570, an address corresponding to a memory access operation is obtained. For example, an address may be received from an external device, or an address may be determined by an internal controller. The memory access operation is performed at 572. At 574, an address corresponding to a subsequent memory access operation is obtained prior to stopping the memory access operation. For example, the address for the subsequent memory access operation may be obtained by receiving it from an external device while performing the memory access operation, or it may be determined by an internal controller. As noted previously, the address for the memory access operation and the address for the subsequent memory access operation define what access lines are used for each memory access operation. After stopping the memory access operation at 576, charge is shared at 578 between access lines used for the memory access operation and access lines to be used for the subsequent memory access operation. The subsequent memory access operation is then performed at 580.

Stopping the memory access operation may include either suspending the memory access operation (e.g., program suspend) or completing the memory access operation. For a memory access operation that is suspended prior to completion, it might be resumed as a next subsequent memory access operation, and may include sharing charge with an immediately prior memory access operation before being resumed. For such an embodiment, the address corresponding to the memory access operation may be saved, e.g., to an additional register of the address register 114 or other storage of the memory, and then reloaded into the primary address register 242 when the memory access operation is ready to resume. Furthermore, where a memory access operation is suspended, it may be desirable not to discharge the access lines used for that memory access operation after sharing charge with access lines to be used for the subsequent memory access operation.

Figure 6:
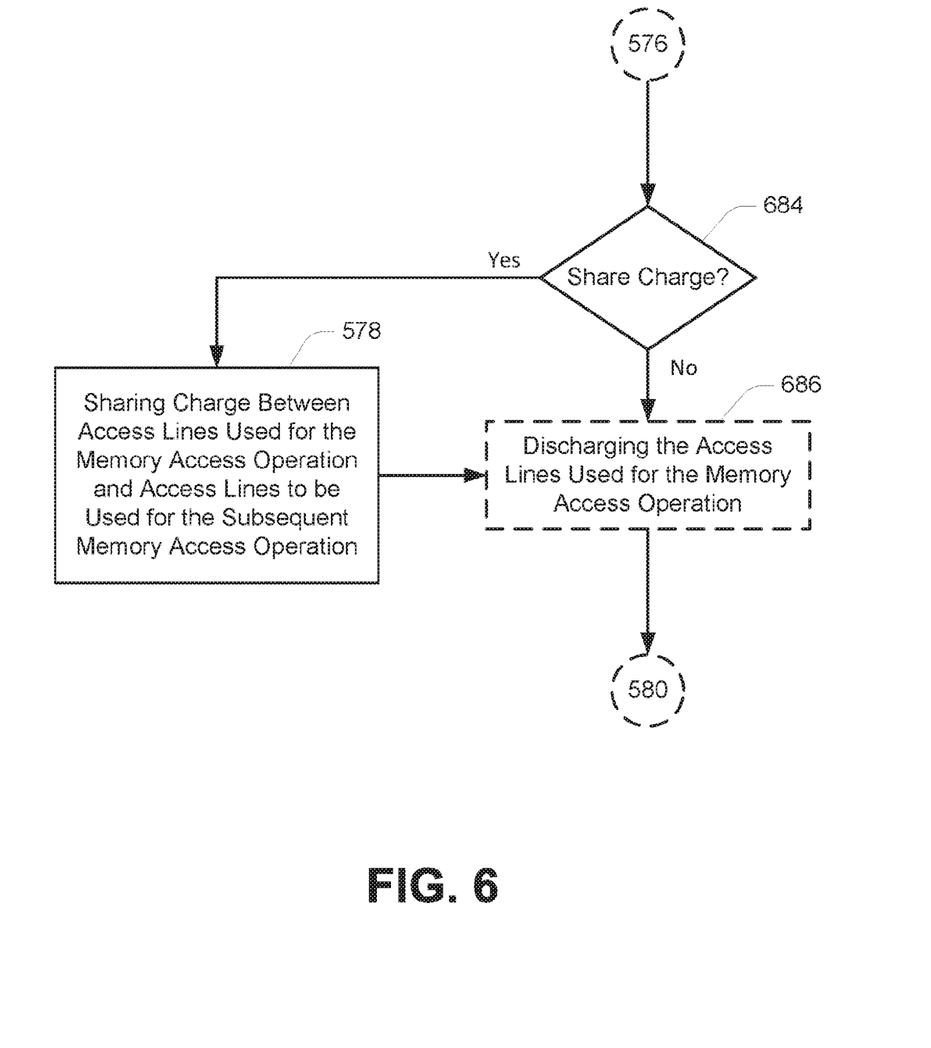
FIG. 6 is a flowchart of a portion of the method of operating a memory of FIG. 5 according to a further embodiment.

It may not be advantageous to share charge between some memory access operations, e.g., if sharing of charge would increase the access time and/or increase the power draw of the subsequent memory access operation. As such, certain embodiments may incorporate a decision process to determine if it is desired to share charge between the two memory access operations, e.g., the memory access operation of 572 and the subsequent memory access operation of 580. Criteria for this determination will depend upon the various memory access operations that a memory may be configured to perform. However, selection of these criteria would follow the general guidance that two memory access operations are candidates for sharing charge where a decrease in access time and/or a decrease in power draw of the subsequent memory access operation could be obtained by sharing charge, depending upon the goals (e.g., reduced access time or reduced power draw) of the designer or user. FIG. 6 is a flowchart of a portion of the method of operating a memory of FIG. 5 according to a further embodiment providing for such a decision process. The portion of FIG. 6 may be positioned in place of 578 of FIG. 5.

At 684, a determination is made whether sharing charge between the access lines used for the memory access operation and the access lines to be used for the subsequent memory access operation is desired. If the determination is not to share charge, the access lines used for the memory access operation might be discharged at 686 as in a conventional memory access operation after completion. If charge is desired to be shared, the process continues to 578, where charge is shared between the access lines used for the memory access operation and the access lines to be used for the subsequent memory access operation. After sharing charge, the process might then proceed to 686, where the access lines used for the memory access operation might be discharged.

Figure 7:
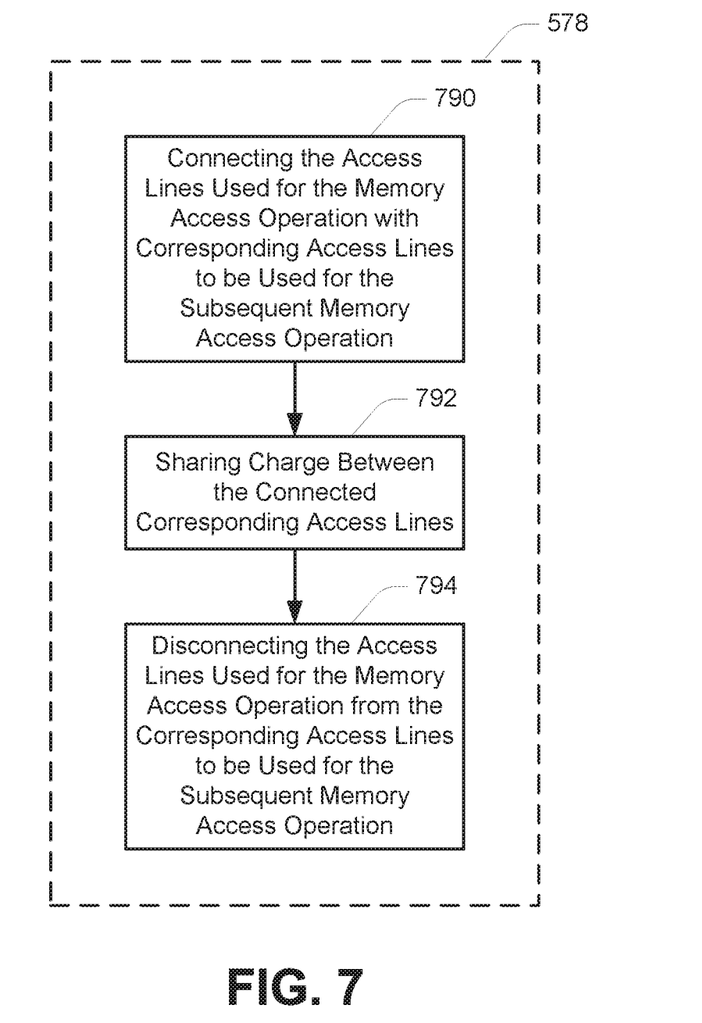
FIG. 7 is a flowchart of a portion of the methods of operating a memory of FIG. 5 or 6 according to another embodiment.

FIG. 7 is a flowchart of a portion of the methods of operating a memory of FIG. 5 or 6 according to another embodiment. The portion of FIG. 7 provides details of the charge sharing 578 according to an embodiment. At 790, the access lines used for the memory access operation are connected with their corresponding access lines to be used to the subsequent memory access operation. At 792, charge is shared between the connected corresponding access lines. And at 794, the access lines used for the memory access operation are disconnected from their corresponding access lines to be used to the subsequent memory access operation.

Although the methods of FIGS. 5-7 are generally depicted as an ordered series of steps, there is no requirement that all of these steps be performed in the order depicted. For example, the address for the memory access operation and the address for the subsequent memory access operation might both be obtained prior to performing the memory access operation, discharging the access lines used for the memory access operation might occur during or after performing the subsequent memory access operation, and comparing the subsequent memory access operation with the memory access operation, and determining whether to share charge, might occur prior to stopping the memory access operation.

An example of the methods of FIGS. 5-7 will be discussed with reference to Table 1 and FIGS. 4A-4B. Table 1 lists voltage levels that might be applied to various nodes of FIGS. 4A-4B during a program operation (e.g., as the memory access operation), during a read operation (e.g., as the subsequent memory access operation) and during charge sharing. For the example, a memory cell coupled to word line $202_{00}$ of memory block $458_0$ is selected for programming during the program operation, and a memory cell coupled to word line $202_{13}$ of memory block $458_1$ is selected for reading during the read operation. Further for the example, time t0 is presumed to be the beginning of the program operation, time t1 is presumed to be the completion of the program operation, time t2 is presumed to be the beginning of the charge sharing, time t3 is presumed to be the completion of the charge sharing, time t4 is presumed to be the beginning of discharging the access lines used for the program operation, and time t5 is presumed to be the beginning of the read operation. Note that the example is intended only to illustrate methods described herein. While the example is believed to be representative, the voltage responses of charge sharing listed in Table 1 are assumed and do not represent measured values from any physical device.

TABLE 1

| Node | Time t0 | Time t1 | Time t2 | Time t3 | Time t4 | Time t5 |
|---|---|---|---|---|---|---|
| $402_0$ | 20 V | 10 V | 7 V | 7 V | 0 V | 8 V |
| $402_1$-$402_2$ | 10 V | 10 V | 7 V | 7 V | 0 V | 8 V |
| $402_3$ | 10 V | 10 V | 7 V | 7 V | 0 V | 3 V |
| $456_0$ | 25 V | 25 V | 10 V | 10 V | 10 V | 0 V |
| $202_{00}$ | 20 V | 10 V | 7 V | 7 V | 0 V | 0 V |
| $202_{01}$-$202_{03}$ | 10 V | 10 V | 7 V | 7 V | 0 V | 0 V |
| $456_1$ | 0 V | 0 V | 10 V | 0 V | 0 V | 10 V |
| $202_{10}$-$202_{12}$ | 0 V | 0 V | 7 V | 7 V | 7 V | 8 V |
| $202_{13}$ | 0 V | 0 V | 7 V | 7 V | 7 V | 3 V |

In the example of Table 1, at time t0, global word line $402_0$ is driven to 20V and the block select line $456_0$ is driven to 25V to activate the block select transistors $454_{00}$-$454_{03}$ to apply the program voltage of 20V to the selected word line $202_{00}$ of the program operation. Global word lines $402_1$-$402_3$ are driven to 10V to apply the inhibit voltage of 10V to the unselected word lines $202_{01}$-$202_{03}$. The block select line $456_1$ is driven to 0V (e.g., grounded) to deactivate the block select transistors $454_{10}$-$454_{13}$, keeping word lines $202_{10}$-$202_{13}$ at their discharged voltages of 0V.

At time t1, the global word line $402_0$ is reduced to 10V at the completion of the program operation, resulting in pulling the selected word $202_{00}$ to 10V. While not necessary, the selected word line $202_{00}$ for the program operation may be pulled down from its program voltage in order to protect memory cells coupled to word line $202_{10}$ from accidental program disturb should they be exposed to voltages above the inhibit voltage upon charge sharing.

At time t2, the global word lines $402_0$-$402_3$ are isolated from the driver circuitry or otherwise allowed to float, and the block select line $456_1$ is driven to 10V. This activates the block select transistors $454_{10}$-$454_{13}$, commonly connecting the word lines $202_{00}$-$202_{03}$ to their corresponding word lines $202_{10}$-$202_{13}$ in a one-to-one relationship, allowing charge sharing between them through the global word lines $402_0$-$402_3$. There is an expected voltage drop upon sharing charge from the word lines $202_{00}$-$202_{03}$, and global word lines $402_0$-$402_3$, as the word lines $202_{10}$-$202_{13}$ are starting from a lower voltage level, e.g., 0V. As such, once charge is shared, these lines may equilibrate at around 7V for this example.

The actual change in voltage level upon charge sharing will depend upon the starting voltage levels and the structure of the various lines sharing charge.

At time t3, the block select line $456_1$ is driven to 0V to deactivate the block select transistors $454_{10}$-$454_{13}$, thereby disconnecting the word lines $202_{10}$-$202_{13}$ from their corresponding word lines $202_{00}$-$202_{03}$. At time t4, the global word lines $402_0$-$402_3$ are driven to 0V (e.g., grounded) to discharge the word lines $202_{00}$-$202_{03}$. At time t5, the global word lines $402_0$-$402_2$ are driven to 8V and the block select line $456_1$ is driven to 10V to activate the block select transistors $454_{10}$-$454_{13}$ to apply the pass voltage of 8V to the unselected word lines $202_{10}$-$202_{12}$ of the read operation. Global word line $402_3$ is driven to 3V to apply the read voltage of 3V to the selected word line $202_{13}$ to begin the read operation.

In the foregoing example, power savings may be facilitated for the subsequent memory access operation (e.g., the read operation) as word lines $202_{10}$-$202_{12}$ only need to be raised a fraction of the difference between their discharged voltage level and their desired voltage level, e.g., from 7V to 8V instead of 0V to 8V. This may also facilitate a corresponding time savings. In addition, word line $202_{13}$ is already above its desired voltage level after the charge sharing at time t4, which can also facilitate power savings as no current is required from its associated driver circuitry to reach its desired voltage.

Figure 8:
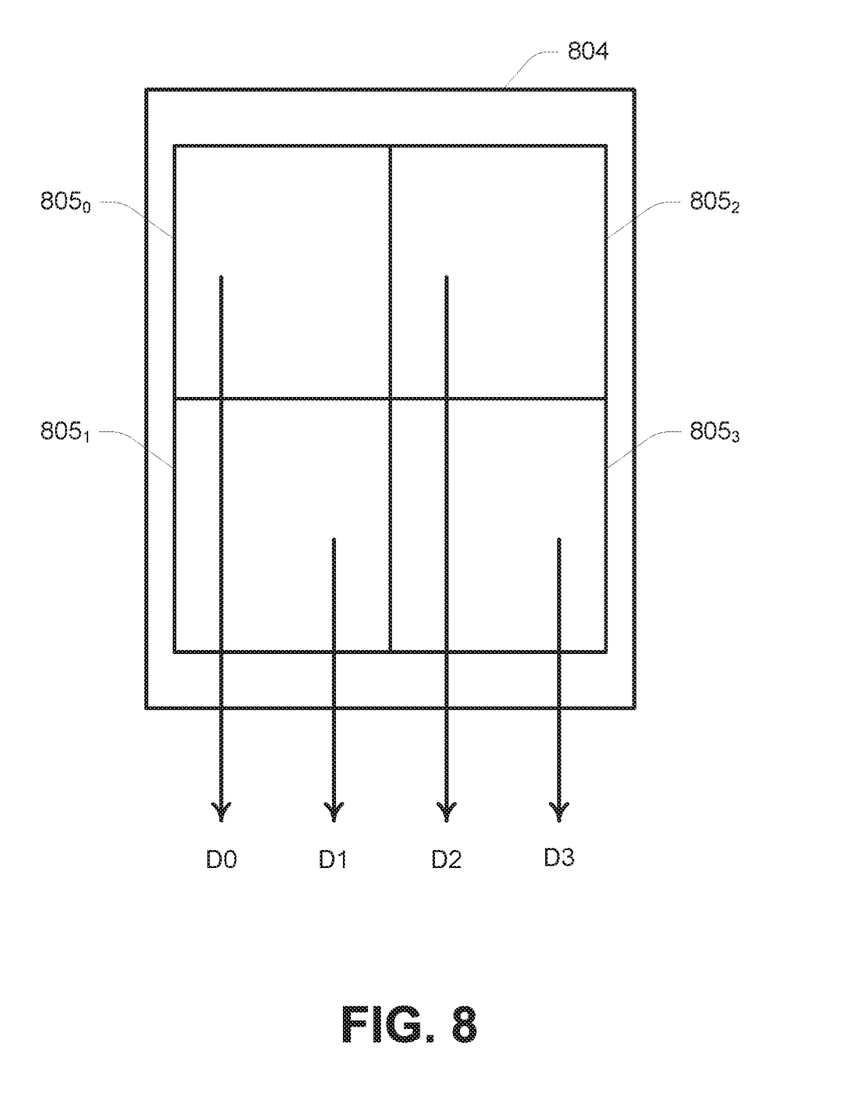
FIG. 8 is a simplified block diagram of an array of memory cells organized in tiles according to an embodiment as could be used in a memory device of the type described with reference to FIG. 1A.

FIG. 8 is a simplified block diagram of an array of memory cells 804 organized in tiles 805 according to an embodiment as could be used in a memory device of the type described with reference to FIG. 1A. The array of memory cells 804 is depicted to include four tiles $805_0$-$805_3$. Each tile 805 may include one or more memory blocks, such as memory blocks 458 of FIG. 4A. The memory blocks of the tiles $805_0$-$805_3$ have their access lines commonly selectively connected to corresponding global access lines. For example, memory strings $206_0$-$206_X$ (X being some integer value between 0 and M, e.g., {M−1}/2 when M is an odd integer value) of FIG. 1B may represent a memory block of tile $805_0$, and memory strings $206_{X+1}$-$206_M$ of FIG. 1B may represent a memory block of tile $805_2$. Similarly, memory strings $206_0$-$206_X$ of FIG. 1B may represent a memory block of tile $805_1$, and memory strings $206_{X+1}$-$206_M$ of FIG. 1B may represent a memory block of tile $805_3$. In addition, memory block $458_0$ of FIG. 4A may represent a memory block of tile $805_0$ and memory block $458_1$ of FIG. 4A may represent a memory block of tile $805_1$. In this manner, methods of charge sharing of various embodiments can be used in an architecture such as this.

The array architecture described with reference to FIG. 8 may include sequential access from each of the tiles 805. For example, a read command may indicate a desire to read on or more units of 16 KB of data from the array of memory cells 804. The read command may have a starting address corresponding to a 4 KB page of data from tile $805_0$. In response to the read command, a first read operation may read 4 KB of data D0 from tile $805_0$ using the starting address, a second read operation may then read 4 KB of data D1 from tile $805_1$ using a second address determined from the starting address, a third read operation may then read 4 KB of data D2 from tile $805_2$ using a third address determined from the second address, and a fourth read operation may then read 4 KB of data D3 from tile $805_3$ using a fourth address determined from the third address. Each address for access of the array of memory cells 804 might be represented by some number of bits, where two of those bits (e.g., two least significant bits) are utilized to indicate to which tile 805 the memory access operation is intended. In such a scheme, each subsequent address could be determined simply by toggling through the combinations of those bits, e.g., 00, 01, 10 and 11, without changing remaining bits of the address. Charge sharing could be utilized between each pair of memory access operations of the sequential memory access.

CONCLUSION

Although specific embodiments have been illustrated and described herein, it will be appreciated by those of ordinary skill in the art that any arrangement that is calculated to achieve the same purpose may be substituted for the specific embodiments shown. Many adaptations of the embodiments will be apparent to those of ordinary skill in the art. Accordingly, this application is intended to cover any adaptations or variations of the embodiments.

What is claimed is:

1. A method of operating a memory, comprising:
  performing a particular memory access operation;
  suspending the particular memory access operation prior to completing the particular memory access operation;
  performing a subsequent memory access operation while the particular memory access operation is suspended;
  resuming the particular memory access operation after completing the subsequent memory access operation; and
  sharing charge between access lines used for the subsequent memory access operation and access lines used for the particular memory access operation during at least one time period selected from a group consisting of between suspending the particular memory access operation and performing the subsequent memory access operation, and between completing the subsequent memory access operation and resuming the particular memory access operation.

2. The method of claim 1, further comprising sharing charge between the access lines used for the subsequent memory access operation and the access lines used for the particular memory access operation during both time periods selected from the group consisting of between suspending the particular memory access operation and performing the subsequent memory access operation, and between completing the subsequent memory access operation and resuming the particular memory access operation.

3. The method of claim 1, further comprising:
  storing an address corresponding to the particular memory access operation to a particular register prior to performing the particular memory access operation;
  saving the address corresponding to the particular memory access operation to a different register after suspending the particular memory access operation;
  storing an address corresponding to the subsequent memory access operation to the particular register prior to performing the subsequent memory access operation; and
  reloading the address corresponding to the particular memory access operation to the particular register prior to resuming the particular memory access operation.

4. The method of claim 3, further comprising:
  using the address corresponding to the particular memory access operation and the address corresponding to the subsequent memory access operation to determine the access lines used for the subsequent memory access operation and the access lines used for the particular memory access operation to select for charge sharing.

5. The method of claim 1, further comprising:
discharging the access lines used for the particular memory access operation after sharing charge between the access lines used for the subsequent memory access operation and the access lines used for the particular memory access operation during the time period between suspending the particular memory access operation and performing the subsequent memory access operation.

6. The method of claim 1, further comprising determining that sharing charge between the access lines used for the subsequent memory access operation and the access lines used for the particular memory access operation during the time period between suspending the particular memory access operation and performing the subsequent memory access operation would result in at least one of a reduction in power draw for performing the subsequent memory access operation, and a reduction in access time of performing the subsequent memory access operation, prior to sharing the charge.

7. The method of claim 1, further comprising determining that sharing charge between the access lines used for the subsequent memory access operation and the access lines used for the particular memory access operation during the time period between completing the subsequent memory access operation and resuming the particular memory access operation would result in at least one of a reduction in power draw for resuming the particular memory access operation, or a reduction in access time of resuming the particular memory access operation, prior to sharing the charge.

8. A method of operating a memory, comprising:
performing a particular memory access operation of a first type, wherein the first type of memory access operation is a type of memory access operation selected from a group consisting of a program operation, a read operation and an erase operation;
prior to stopping the particular memory access operation, obtaining an address corresponding to a subsequent memory access operation of a second type, wherein the second type of memory access operation is a type of memory access operation selected from a group consisting of a program operation, a read operation and an erase operation, and wherein the second type of memory access operation is a different type of memory access operation than the first type of memory access operation;
stopping the particular memory access operation;
sharing charge between access lines used for the particular memory access operation and access lines to be used for the subsequent memory access operation; and
performing the subsequent memory access operation.

9. The method of claim 8, further comprising:
prior to stopping the subsequent memory access operation, obtaining an address corresponding to a next subsequent memory access operation of a third type, wherein the third type of memory access operation is a type of memory access operation selected from a group consisting of a program operation, a read operation and an erase operation, and wherein the third type of memory access operation is a different type of memory access operation than the second type of memory access operation;
stopping the subsequent memory access operation;
sharing charge between access lines used for the subsequent memory access operation and access lines to be used for the next subsequent memory access operation; and
performing the next subsequent memory access operation.

10. The method of claim 9, wherein stopping the particular memory access operation comprises suspending the particular memory access operation and wherein performing the next subsequent memory access operation comprises resuming the particular memory access operation.

11. The method of claim 9, further comprising discharging the access lines used for the particular memory access operation after sharing charge with the access lines to be used for the subsequent memory access operation.

12. The method of claim 9, wherein the access lines used for the particular memory access operation are not discharged after sharing charge with the access lines to be used for the subsequent memory access operation.

13. The method of claim 8, wherein obtaining the address corresponding to the subsequent memory access operation comprises receiving the address from an external controller.

14. A method of operating a memory, comprising:
obtaining an address corresponding to a particular memory access operation and storing the address corresponding to the particular memory access operation to a particular register of the memory;
performing the particular memory access operation responsive to the address in the particular register;
obtaining an address corresponding to a subsequent memory access operation prior to stopping the particular memory access operation and storing the address corresponding to the subsequent memory access operation to a different register of the memory;
stopping the particular memory access operation;
sharing charge between access lines used for the particular memory access operation and access lines to be used for the subsequent memory access operation;
transferring the address in the different register to the particular register;
performing the subsequent memory access operation responsive to the address in the particular register;
obtaining an address corresponding to a next subsequent memory access operation prior to stopping the subsequent memory access operation and storing the address corresponding to the next subsequent memory access operation to a specific register of the memory;
stopping the subsequent memory access operation;
sharing charge between access lines used for the subsequent memory access operation and access lines to be used for the next subsequent memory access operation;
transferring the address in the specific register to the particular register; and
performing the next subsequent memory access operation responsive to the address in the particular register.

15. The method of claim 14, wherein the particular memory access operation and the subsequent memory access operation are each of a type selected from a group consisting of a program operation, a read operation and an erase operation.

16. The method of claim 15, wherein the type of the particular memory access operation and the type of the subsequent memory access operation are the same.

17. The method of claim 16, wherein the next subsequent memory access operation is of a type selected from a group consisting of a program operation, a read operation and an erase operation, and wherein the type of the next subsequent memory access operation is the same as the type of the particular memory access operation and the type of the subsequent memory access operation.

18. The method of claim 15, wherein the next subsequent memory access operation is of a type selected from a group consisting of a program operation, a read operation and an erase operation, wherein the type of the particular memory access operation is different than the type of the subsequent memory access operation, and wherein the type of the subsequent memory access operation is different than the type of the next subsequent memory access operation.

19. The method of claim 14, wherein stopping the particular memory access operation comprises completing the particular memory access operation, wherein storing the address corresponding to the next subsequent memory access operation to the specific register of the memory comprises storing the address corresponding to the next subsequent memory access operation to the different register of the memory, and wherein transferring the address in the specific register to the particular register comprises transferring the address in the different register to the particular register.

20. The method of claim 14, wherein stopping the particular memory access operation comprises suspending the particular memory access operation, wherein stopping the subsequent memory access operation comprises completing the subsequent memory access operation, and wherein performing the next subsequent memory access operation comprises resuming the particular memory access operation.

* * * * *